UNITED STATES PATENT OFFICE.

WILLIAM AUGUSTUS HALL, OF NEW YORK, N. Y.

PROCESS FOR THE PRODUCTION OF SULFUR.

1,083,249. Specification of Letters Patent. Patented Dec. 30, 1913.

No Drawing. Application filed October 10, 1912. Serial No. 725,025.

*To all whom it may concern:*

Be it known that I, WILLIAM AUGUSTUS HALL, a citizen of the United States Republic, and resident of the city of New York, county of New York, and State of New York, United States of America, have invented a certain new and useful Improvement in Processes for the Production of Sulfur, of which the following is a specification.

This invention relates to a process for the production of sulfur by the mutual decomposition of sulfureted hydrogen and sulfur dioxid in accordance with the well known equation $$2H_2S + SO_2 = 3S + 2H_2O.$$

Theoretically, when these gases are brought together in the proportions indicated by this equation, a complete reaction should take place, all the sulfur being deposited and water vapor being formed. In actual practice this reaction is not even approximately complete. Considerable amounts of thionic acids are formed, involving quite considerable losses in sulfur. To bring about an approximately complete reaction a most intimate mixing of the gases for a considerable space of time in large settling chambers is required. Various suggestions have been made for overcoming this difficulty and for expediting the reaction. Such suggestions include the passing of the gases through solutions of certain salts such as calcium chlorid, magnesium salts, or aluminum sulfate or through a chamber in which a discharge of electric sparks is taking place, etc., but none of these suggestions has been employed as the basis of a process on a commercial scale. Now I have ascertained as the result of experimental research that when these gases are mixed in the theoretically correct combining proportions and at a high temperature in the presence of sulfur vapor obtained by the distillation of sulfur or from another source, the reaction becomes complete or at least very approximately so, and takes place very quickly and with substantially no formation of thionic acids, the two gases, when intimately mingled with hot sulfur vapor, combining or mutually decomposing with great avidity and completeness.

My invention therefore consists broadly in facilitating the mutual decomposition of sulfureted hydrogen gas and sulfur dioxid gas and the collection of sulfur therefrom by bringing a mixture of these gases into contact with highly heated sulfur vapor.

In carrying my invention into effect I pass sulfureted hydrogen gas and sulfur dioxid gas through a pipe or chamber in their proper combining proportions at any temperature between about 300° C. and 800° C., intermingled with a large proportion of sulfur vapor produced by the distillation of sulfur from any suitable source. I prefer to supply also a small amount of steam since I find that the presence of steam greatly facilitates the reaction. If the gases and sulfur vapor are passed through a pipe even at a high rate of speed the reaction becomes complete after a few feet of the pipe have been traversed by the gases; that is, only a few seconds are required for the completion of the reaction. The percentage of sulfur vapor to be employed may vary from about 50% to 90% of the whole of the sulfur (free and combined) in said gases.

Having described my invention what I claim and desire to secure by Letters Patent of the United States is:—

1. The herein described process of producing sulfur from hydrogen sulfid and sulfur dioxid, which comprises bringing together the sulfur dioxid and hydrogen sulfid in the presence of sulfur vapor, in amount equal to from 50 to 90%, and at a temperature of between 300 and 800° C.

2. The herein described process of producing sulfur from hydrogen sulfid and sulfur dioxid, which comprises bringing together the sulfur dioxid and hydrogen sulfid in the presence of sulfur vapor and steam, at a temperature of between 300 and 800° C., and maintaining said temperature until the reaction between hydrogen sulfid and sulfur dioxid is substantially complete.

3. The herein described process of producing sulfur from hydrogen sulfid and sulfur dioxid, which comprises bringing together the sulfur dioxid and hydrogen sulfid in substantially the theoretical proportions in the presence of sulfur vapor in amount equal to from 20 to 90%, and steam at a temperature of between 300 and 800° C.

4. The herein described process of producing sulfur from hydrogen sulfid and sulfur dioxid, which comprises bringing together the sulfur dioxid and hydrogen sulfid in substantially the theoretical proportions in the presence of sulfur vapor and steam at a temperature of between 300 and 800° C., and maintaining said temperature until the reaction between hydrogen sulfid and sulfur dioxid is substantially complete.

In testimony whereof I have signed my name to the specification in the presence of two subscribing witnesses.

WILLIAM AUGUSTUS HALL.

Witnesses:
  HAROLD G. C. FAIRWEATHER,
  ALFRED T. BURBERY.